Aug. 13, 1940.
R. R. CHAPPELL
2,211,493
VARIABLE RESISTOR
Filed Nov. 22, 1938
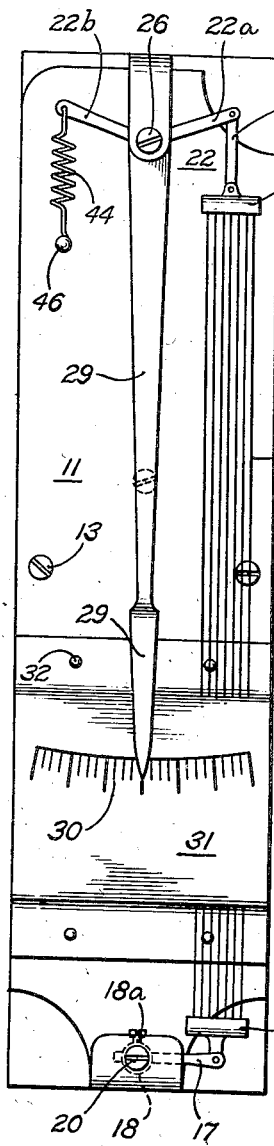
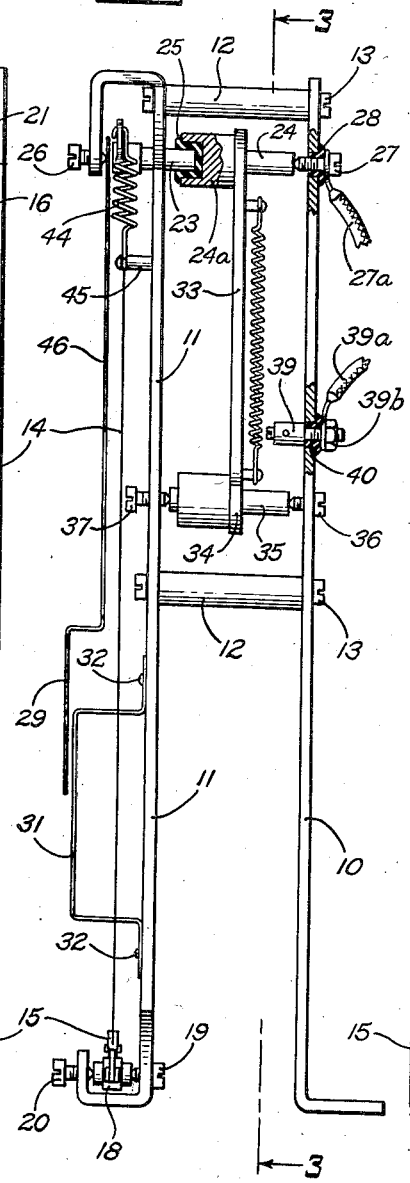
INVENTOR.
Ralph R. Chappell
BY Stephen Cerstvik
ATTORNEY.

Patented Aug. 13, 1940

2,211,493

UNITED STATES PATENT OFFICE 2,211,493

VARIABLE RESISTOR

Ralph R. Chappell, Richmond, Va., assignor to Bendix Aviation Corporation, South Bend, Ind., a corporation of Delaware Application November 22, 1938, Serial No. 241,875

6 Claims. (Cl. 201—55)

The present invention relates to means for varying an electrical quantity and more particularly to means for varying the value of resistance in an electrical circuit.

The invention embodies a novel resistance varying element wherein the amount of resistance included between two terminals is varied in a frictionless manner.

More specifically the device embodying the invention is provided for the purpose of eliminating drag from a variable resistor wherein the friction between the moving elements is changed from a sliding to a rolling friction so that the total amount of friction is practically negligible.

In similar devices of the prior art wherein means are provided for varying the resistance of an element, considerable force has been required in order to produce an appreciable variation of resistance. Such resistance varying devices include pressure actuated devices for varying the resistance by variation of pressure on a group of resistive elements. This type of resistance varying element has required considerable pressure in order to produce a desired variation in resistance and such a force is not available when the resistance is to be varied automatically by changes in certain conditions.

Further, certain other devices of the prior art have comprised elements slidably movable over each other whereby the change in relative position has produced a change in the resistance of the device. The friction between the sliding elements has required a force sufficient to overcome such friction in order to produce variations in the values of the resistance of said device. Such sliding friction has been relatively high thereby requiring a considerable force to produce a desired variation in resistance.

In measuring devices wherein high precision is required and wherein very small forces are available for controlling the resistance varying means, it is necessary to utilize means for varying the electrical resistance of an element in proportion to variations in a factor, which variations produce a very small actuating force. For example, in radio meteorography, changes in such a factor as the humidity of the atmosphere are utilized to produce a force to in turn vary an electrical resistance in order to produce an electrical force proportional to variations in humidity. The element utilized to measure the change in humidity comprises a group of human hairs which are so delicate and frangible that they cannot be utilized to transmit a large force without producing permanent elongation or breakage thereof. In view of such conditions, the resistance varying devices of the prior art have been unsuitable for such precision work since the forces required to vary the resistance have been greater than those that can be safely transmitted by actuating elements such as the hair elements of a humidity responsive device.

Accordingly, one of the objects of the present invention is to provide a novel variable resistor whereby the foregoing undesirable characteristics are eliminated.

Another object is to provide a novel variable resistor which shall be practically frictionless.

A further object is to provide a novel resistor which requires a very small force for producing a variation in the value of the resistance of said resistor.

Still a further object of the invention is to provide a novel variable resistor comprising a rotatable element movable over a resistor whereby the resistance of said resistor is varied.

Another object is to provide a novel variable resistor comprising a pair of oscillatable arms in the form of cams one of which comprises a resistor and the other a contacting conductor.

A further object is to provide a novel resistor comprising a pair of electrical elements mounted for rocking motion over each other whereby the resistance between the ends of the elements may be varied.

The above and other objects and advantages of the invention will appear more fully hereinafter from a consideration of the detailed description which follows, taken together with the accompanying drawing wherein is illustrated one embodiment of the invention. It is to be expressly understood, however, that the drawing is for purposes of illustration and description only, and is not designed as a definition of the limits of the invention, reference being primarily had for this purpose to the appended claims.

In the drawing wherein like reference characters refer to like parts throughout the several views;

Fig. 1 is a front elevation of one form of the novel device embodying the invention;

Fig. 2 is a side elevation of the device illustrated in Fig. 1; and

Fig. 3 is a sectional view taken on line 3—3 of Fig. 2.

In the drawing, the invention is shown, in the present instance, as applied to a combination humidity indicator and variable resistor for producing a varying electrical current whose variations are proportional to the variations in humidity, although it is to be expressly understood that the novel resistor may be applied to any device wherein a variation of resistance by a small force is desired or required.

Referring to the drawing and more particularly to Fig. 2, the invention is illustrated as embodied in a humidity indicator comprising a pair of parallel plates 10 and 11 which are maintained in spaced relation by means of threaded spacers 12 and screws 13.

A humidity responsive element 14 is mounted adjacent the front plate 11 and, in the present embodiment, comprises a plurality of human hairs mounted at their ends in clamps 15 and 16. Clamp 15 is pivotally connected to a link 17 at one end thereof (see Fig. 1) while the other end of said link is inserted into an opening in shaft 18 and is connected thereto by a screw 18a. Shaft 18 is mounted for movement of rotation about a pair of pointed screws 19 and 20 coacting with openings in the ends of said shaft.

Clamp 16 is connected by an articulated link 21 to one arm 22a of the bell-crank 22 integral with a shaft 23 passing through the front plate 11 and connected to the enlarged end 24a of a shaft 24 by means of an insulating bushing 25. Shafts 23 and 24 are rigidly joined by said bushing 25 and are axially aligned and mounted for movement of oscillation between the pointed screws 26 and 27 which are mounted respectively in the U-shaped end of front plate 11 and an insulated bushing 28 provided in plate 10. Screw 27 also serves as one of the binding posts of the novel resistor that will be described in more detail later.

A pointer 29 is mounted on shaft 23 for oscillation therewith over scale 30 inscribed on a U-shaped bracket 31 fastened by rivets 32 to the front plate 11. Openings (not shown) are provided in the bracket 31 to allow the passage therethrough of the hair elements 14 and said openings are of such size that the hair elements are mounted entirely free of said bracket.

The novel means of the present invention comprise a cam-shaped element or arm 33 of conducting material mounted on shaft 24 for rotation therewith and in abutting relation with the large end 24a thereof. Cam arm 33 is mounted in contact with a cam-shaped resistor arm 34 of insulating material, carried by a shaft 35 mounted at its ends in pointed screws 36 and 37 for oscillation about these screws as pivots. A resistance wire 38 (see Fig. 3) is mounted on the cam arm 34 with one end of said wire leading to a binding post 39 mounted in an insulating bushing 40 in plate 10. A conductor 39a is connected to the binding post 39 by means of nut 39b, and said conductor 39a may be connected in series with an electrical circuit, the other end of which is connected by means of the conductor 27a to the screw 27 which serves as the second binding-post of the novel resistor device.

A spring 41 connected to pins 42 and 43 on cam arms 33 and 34, respectively, urges these cam arms together at all positions of cam arm 33, whereby the latter cam arm rolls over the resistor wire 38 or arm 34 to vary the amount of resistance between the binding posts 27 and 39.

It is to be specifically understood that although the resistance element is shown as comprising an insulated cam arm 34 with a resistor wire 38 wound thereon, said resistance element may be made as a unit as, for example, by constructing the cam arm 34 itself of a suitable resistance material in which event said cam arm will be mounted so as to be insulated from the plates 10 and 11.

A spring 44 is connected at one end thereof to arm 22b of the bell-crank 22 and is fastened to the front plate 11 by a post 45 and screw 46 threaded into said post.

The operation of the device is as follows:

The humidity responsive element 14 is maintained in the position to which it has become elongated by the humidity in the atmosphere by means of spring 44, and contractions of said humidity responsive element occur against the force of said spring 44, acting through arms 22b and 22a of the bell-crank 22, and the link 21 attached to the clamp 16 of the humidity responsive element. Upon a change in humidity, the expansion or contraction of the element 14 operates with or against spring 44 to oscillate the shafts 23 and 24 and thereby rock the conductive cam arm 33. Such rocking of cam arm 33 forces the insulated cam arm 34 to follow it due to the force of spring 41 urging these cam arms together. This rocking of cam arm 33, therefore, increases or decreases the amount of resistance in the circuit between the binding posts 27 and 39.

The cam arms 33 and 34 are so designed that relative movement thereof with changes in humidity produces changes in resistance which are proportional to the humidity change. The rocking movement of the cam arms 33 and 34 eliminates all sliding friction and reduces the total friction to the almost negligible rolling friction between the cams.

Oscillation of shaft 23 also oscillates the pointer 29 over the scale 30 to thereby indicate in conjunction with said scale a value of humidity which will also be indicated at a remote point by the means actuated by the current passing through the novel resistor device.

Novel means are thus provided which are substantially frictionless and whereby, upon changes in a force of very small magnitude such as that produced by changes in humidity acting upon a humidity responsive hair element, there are produced changes in resistance which are directly proportional to the changes in this force of very small magnitude.

Although but one embodiment of the invention has been illustrated and described, various changes and modifications in form, materials and relative arrangement of parts, which will now appear to those skilled in the art, may be made without departing from the scope of the invention. Reference is, therefore, to be had to the appended claims for a definition of the limits of the invention.

What is claimed is:

1. A variable resistance device for controlling the resistance of an electrical circuit, comprising a pair of rocker arms pivoted adjacent each other for relative rocking movement therebetween and at least one of which is curved and in rolling contact with the other, one of said arms comprising a resistor and the other a conducting element whereby, upon relative rocking movement between said arms, the point of contact therebetween is varied, means for connecting said resistor and conducting element to an electrical circuit to vary the resistance of said circuit upon relative rocking movement between said arms, and means maintaining said arms in rolling contact with each other at all relative positions thereof.

2. A variable resistor, comprising a pair of plates, means mounting said plates in spaced relation, aligned pivots mounted on each of said plates respectively, a rocker shaft mounted for movement about said pivots, a rocking arm of insulating material carried by said shaft and having an electrical resistance thereon, a second pair of pivots, one of which pair is mounted on each of said plates, respectively, a second shaft mounted for movement about said second pivots, a second rocker arm carried by said second shaft, means resiliently urging said last-named arm and said resistance carrying arm into contact with each other, a conductor connected to one end of said resistance, and a conductor connected to one end of said second arm, said second arm variably contacting said resistance, thereby varying the amount of resistance in series with said conductors.

3. A rheostat comprising a pivoted rocker arm of insulating material, a second pivoted rocker arm of conducting material adjacent said first arm, at least one of said arms being curved and in rolling contact with the other, a resistor carried by said first arm and in electrical contact with said second arm, resilient means maintaining said arms in rolling contact with each other whereby, upon relative rocking movement between said arms, the point of contact between said resistor and said conducting arm is varied to vary the amount of resistance in a circuit to which said rheostat may be connected, and a sensitive element responsive to changes in a condition of the atmosphere for actuating one of said arms.

4. A rheostat for actuation by a sensitive element such as a humidostat or thermostat, comprising a pair of pivot rocker arms one of which is connected to said element for actuation thereby to cause relative rocking movement between said arms and at least one of which is curved and in rolling contact with the other, one of said arms comprising a resistor and the other a conducting element whereby, upon relative rocking movement between said arms, the point of contact therebetween is varied, means for connecting said resistor and conducting element to an electrical circuit to vary the resistance thereof upon relative rocking movement between said resistor and conducting element, and resilient means maintaining said resistor and said conducting element in rolling contact with each other at all relative positions thereof.

5. A variable resistance device for controlling the resistance of an electrical circuit in accordance with changes in relative humidity, comprising a pair of rocker arms pivoted adjacent each other for relative rocking movement therebetween and at least one of which is curved and in rolling contact with the other, a humidity responsive element connected to one of said arms for actuating the same, one of said arms comprising a resistor and the other a conducting element whereby, upon relative rocking movement between said arms, the point of contact between said resistor and said conducting element is varied, means for connecting said resistor and said conducting element to an electrical circuit to vary the resistance thereof upon relative rocking movement between said resistor and conducting element, and resilient means maintaining said resistor and conducting element in rolling contact with each other at all relative positions thereof.

6. A variable resistance device for controlling the resistance of an electrical circuit in accordance with changes in relative humidity, comprising a rocker arm of insulating material pivoted for rocking movement, a second rocker arm of conducting material pivoted adjacent said first rocker arm for rocking movement, a resistance coil carried by said first arm and in electrical contact with said conducting arm, one of said arms being curved and in rolling contact with the other whereby, upon relative rocking movement of said arms, the point of contact between said resistance coil and said conducting arm is varied, a humidity responsive element having one end anchored and the other end connected to one of said rocker arms to actuate the same to cause relative rocking movement therebetween, means for connecting said resistance coil and said conducting arm to an electrical circuit to vary the resistance thereof upon relative rocking movement of said arms, and resilient means maintaining said resistance coil and said conducting arm in rolling contact at all relative positions thereof.

RALPH R. CHAPPELL.